United States Patent [19]
Chaput

[11] 4,104,613
[45] Aug. 1, 1978

[54] VEHICLE HEADLIGHT ALARM

[75] Inventor: Stanley H. Chaput, Sarnia, Canada

[73] Assignee: The Raymond Lee Organization, Inc., New York, N.Y.; a part interest

[21] Appl. No.: 763,642

[22] Filed: Jan. 28, 1977

[51] Int. Cl.² ............................................. G08B 21/00
[52] U.S. Cl. ..................... 340/52 D; 315/82
[58] Field of Search ............... 340/52 D; 315/77, 80, 315/82, 84; 307/10 LS

[56] References Cited

U.S. PATENT DOCUMENTS

| 3,072,884 | 1/1963 | Hughes | 340/52 D |
| 3,467,831 | 9/1969 | Wilson et al. | 315/84 X |

FOREIGN PATENT DOCUMENTS 970,449   7/1975   Canada ................... 340/52 D

*Primary Examiner*—Alvin H. Waring
*Attorney, Agent, or Firm*—Daniel Jay Tick

[57] ABSTRACT

A vehicle headlight alarm is actuated when the ignition switch of an automotive vehicle is turned off and the headlight switch is still ON.

1 Claim, 1 Drawing Figure

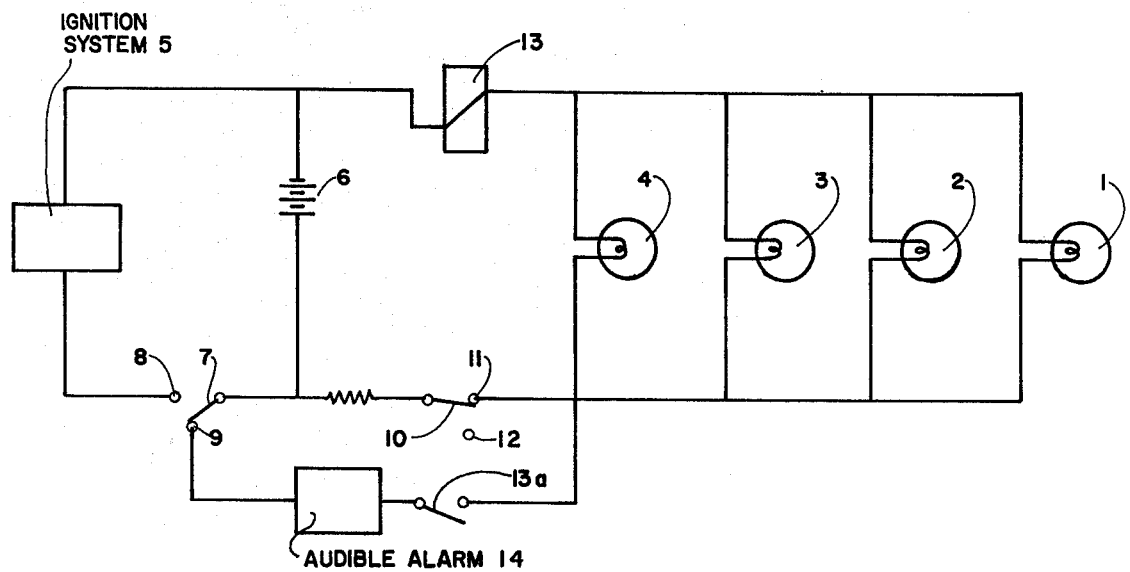

VEHICLE HEADLIGHT ALARM

BACKGROUND OF THE INVENTION

The present invention relates to a vehicle headlight alarm. More particularly, the invention relates to a vehicle headlight alarm for an automotive vehicle having headlights, tail lights, an ignition system, a battery, an ignition switch for controlling the ignition system and a headlight switch for controlling the headlights and tail lights.

Objects of the invention are to provide a vehicle headlight alarm of simple structure, which is inexpensive in manufacture, installed with facility and convenience in new and existing automotive vehicles, and functions efficiently, effectively and reliably to warn the operator of the vehicle when the headlight switch is still ON after the ignition switch has been turned off.

BRIEF DESCRIPTION OF THE DRAWINGS

In order that the invention may be readily carried into effect, it will now be described with reference to the accompanying drawing, wherein the single FIGURE is a circuit diagram of an embodiment of the vehicle headlight alarm of the invention.

DETAILED DESCRIPTION OF THE INVENTION

The vehicle headlight alarm of the invention is for an automotive vehicle having headlights 1 and 2 and tail lights 3 and 4, as well as other lights not shown in the FIGURE. The vehicle has an ignition system 5 of the usual type and a battery 6 of the usual type.

An ignition switch 7 is electrically connected between the battery 6 and the ignition system 5 for selectively controlling the ignition of the vehicle in the usual manner. The ignition switch has an ON position, indicated by an electrical contact 8, in which it conducts electrical energy from the battery 6 to the ignition system 5, and an OFF position, indicated by an electrical contact 9, in which it prevents electrical energy from the battery from reaching the ignition system.

A headlight switch 10 of the usual type is electrically connected between the battery 6 and the headlights 1 and 2, the tail lights 3 and 4, and other lights, for selectively controlling the energization of said lights. The headlight switch 10 has an ON position, indicated by an electrical contact 11, in which it conducts electrical energy from the battery 6 to the lights 1 to 4, and so on, and an OFF position, indicated by an electrical contact 12, in which it prevents electrical energy from the battery from reaching said lights.

The vehicle headlight alarm of the invention comprises a relay having an energizing winding 13 electrically connected between the battery 6 and the lights 1 to 4, and so on, in a manner whereby when the headlight switch 10 is ON, the relay winding is energized and when said headlight switch is OFF, said relay winding is deenergized.

An audible alarm 14 of any suitable type is electrically connected in series with a relay armature switch 13a controlled in operation by the relay energizing winding 13. The series connection of the alarm 14 and the relay armature switch 13a is connected between the OFF electrical contact 9 of the ignition switch 7 and a point electrically connected to the ON electrical contact 11 of the headlight switch 10.

Thus, when the headlight switch 10 is in its ON position, wherein it is in electrical contact with its ON electrical contact 11, and the ignition switch 7 is in its OFF position, wherein it is in electrical contact with its OFF electrical contact 9, the relay energizing winding 13 is energized by the battery 6 via said headlight switch in a circuit 6, 10, 11, 4, 13. When the energizing winding 13 is energized, it closes its relay armature switch 13a thereby closing the circuit of the audible alarm 14, which circuit includes the components 7, 9, 14, 13a, 4, 13, 6.

While the invention has been described by means of a specific example and in a specific embodiment, I do not wish to be limited thereto, for obvious modifications will occur to those skilled in the art without departing from the spirit and scope of the invention.

I claim:

1. A vehicle headlight alarm for an automotive vehicle having headlights, tail lights, an ignition system, a battery, an ignition switch electrically connected between the battery and the ignition system for selectively controlling the ignition of the vehicle, said ignition switch having an ON position in which it conducts electrical energy from the battery to the ignition system and an OFF position in which it prevents electrical energy from the battery from reaching the ignition system and a headlight switch electrically connected between the battery and the headlights and tail lights for selectively controlling the energization of said lights, said headlight switch having an ON position in which it conducts electrical energy from the battery to the lights and an OFF position in which it prevents electrical energy from the battery from reaching the lights, said vehicle headlight alarm comprising a relay having an energizing winding electrically connected between the battery and the lights in a manner whereby when the headlight switch is ON the relay winding is energized and when the headlight switch is OFF the relay winding is deenergized and a relay armature switch controlled in position by said relay winding;

an electrical contact positioned at the OFF position of the ignition switch; and an audible alarm connected in series with the relay armature switch between the electrical contact and a point electrically connected to the headlight switch in its ON position whereby when the headlight switch is in its ON position and the ignition switch is in its OFF position, the relay energizing winding is energized by the battery via the headlight switch and closes its relay armature switch to actuate the alarm.

\* \* \* \* \*